United States Patent [19]

Nagai

[11] Patent Number: 5,737,917
[45] Date of Patent: Apr. 14, 1998

[54] DEVICE FOR JUDGING DETERIORATION OF CATALYST OF ENGINE

[75] Inventor: Toshinari Nagai, Shizuoka, Japan

[73] Assignee: Toyota Jidosha Kabushiki Kaisha, Aichi, Japan

[21] Appl. No.: 753,737

[22] Filed: Nov. 29, 1996

[30] Foreign Application Priority Data

Dec. 7, 1995 [JP] Japan ..................................... 7-319219

[51] Int. Cl.[6] ..................................................... F01N 3/20
[52] U.S. Cl. .............................. 60/276; 60/277; 73/118.1
[58] Field of Search ............................ 60/274, 276, 277; 73/118.1

[56] References Cited

U.S. PATENT DOCUMENTS

| | | | |
|---|---|---|---|
| 5,097,700 | 3/1992 | Nakane | 73/118.1 |
| 5,159,810 | 11/1992 | Grutter et al. | 60/277 X |
| 5,279,116 | 1/1994 | Shimizu et al. | 60/277 |
| 5,301,501 | 4/1994 | Shimizu et al. | 60/274 |
| 5,359,853 | 11/1994 | Shimizu | 60/276 |
| 5,377,484 | 1/1995 | Shimizu | 60/276 |
| 5,412,941 | 5/1995 | Suzuki et al. | 60/276 |

FOREIGN PATENT DOCUMENTS

A-7-26944  1/1995  Japan.

*Primary Examiner*—Tony M. Argenbright
*Attorney, Agent, or Firm*—Oliff & Berridge, PLC

[57] ABSTRACT

A device for judging the deterioration of a three-way catalyst comprising an upstream $O_2$ sensor and a downstream $O_2$ sensor which are arranged in the exhaust passage upstream and downstream of the three-way catalyst respectively. When the ratio of length of the output signal response curve of the downstream $O_2$ sensor and the length of the output signal response curve of the upstream $O_2$ sensor is over a threshold level, it is judged that the three-way catalyst has deteriorated. The judgement of deterioration of the three-way catalyst is performed when the three-way catalyst starts to be activated. At this time, the lower the temperature of the downstream $O_2$ sensor, the lower the threshold level is made.

11 Claims, 17 Drawing Sheets

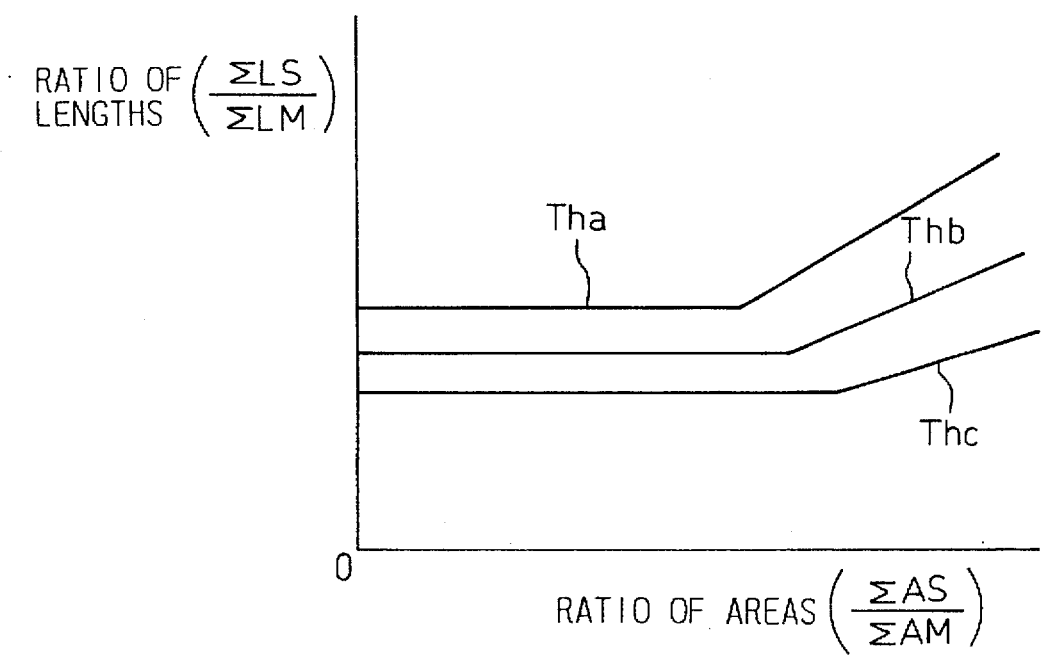

DEVICE FOR JUDGING DETERIORATION OF CATALYST OF ENGINE

BACKGROUND OF THE INVENTION

1. Field of the Invention

The present invention relates to a device for judging the deterioration of a catalyst of an engine.

2. Description of the Related Art

Known in the art is an internal combustion engine in which a three-way catalyst is arranged in the engine exhaust passage, an upstream air-fuel ratio sensor is arranged inside the engine exhaust passage upstream of the three-way catalyst, a downstream air-fuel ratio sensor is arranged in the engine exhaust passage downstream of the three-way catalyst, and the three-way catalyst is judged to have deteriorated or not based on the output signals of the upstream air-fuel ratio sensor and the downstream air-fuel ratio sensor (see Japanese Unexamined Patent Publication (Kokai) No. 7-26944). In this internal combustion engine, it is possible to judge if the three-way catalyst has deteriorated early after the engine startup since the judgement of deterioration of the three-way catalyst is started during engine warmup.

However, it takes some time after engine startup until the air-fuel ratio sensor warms up and therefore the deterioration of the three-way catalyst is judged in a state where the air-fuel ratio sensor is not sufficient warmed up if the judgement of deterioration of the three-way catalyst is commenced early after the engine startup. However, when the air-fuel ratio sensor is not sufficiently warmed up, the air-fuel ratio sensor does not generate the correct output and therefore if the deterioration is judged based on the output signals of the air-fuel ratio sensors at this time, the three-way catalyst will for example be mistakenly judged to not have deteriorated despite having deteriorated. That is, if the judgement of the deterioration of the three-way catalyst is commenced during engine warmup, unless the extent of the warmup of the air-fuel ratio sensor, that is, the activation, is considered, it will not be possible to correctly judge if the three-way catalyst has deteriorated. In the above-mentioned internal combustion engine, however, no consideration is given at all to the extent of warmup of the air-fuel ratio sensor, that is, its activation, and therefore in the above internal combustion engine there is the problem that it is not possible to accurately judge if the three-way catalyst has deteriorated at the time of warmup.

SUMMARY OF THE INVENTION

An object of the present invention is to provide a device for judging the deterioration of a catalyst which is capable of accurately judging whether or not the catalyst slightly deteriorates.

According to the present invention, there is provided a device for judging the deterioration of a catalyst arranged in an exhaust passage of an engine, comprising air-fuel ratio detecting means arranged in the exhaust passage and producing an output signal representative of the air-fuel ratio; deterioration degree calculating means for calculating a degree of the deterioration of the catalyst on the basis of the output signal of the air-fuel ratio detecting means; deterioration judging means for judging that the catalyst deteriorates when the degree of deterioration exceeds a predetermined threshold value; estimating means for estimating a degree of activation of the air-fuel ratio detecting means; and threshold value controlling means for controlling the threshold value in response to the degree of activation to lower the threshold value the lower the degree of activation.

BRIEF DESCRIPTION OF THE DRAWINGS

The present invention may be more fully understood from the description of preferred embodiments of the invention set forth below, together with the accompanying drawings, in which:

FIG. 15 is a graph of the threshold level Th;

DESCRIPTION OF THE PREFERRED EMBODIMENTS

Figure 1:
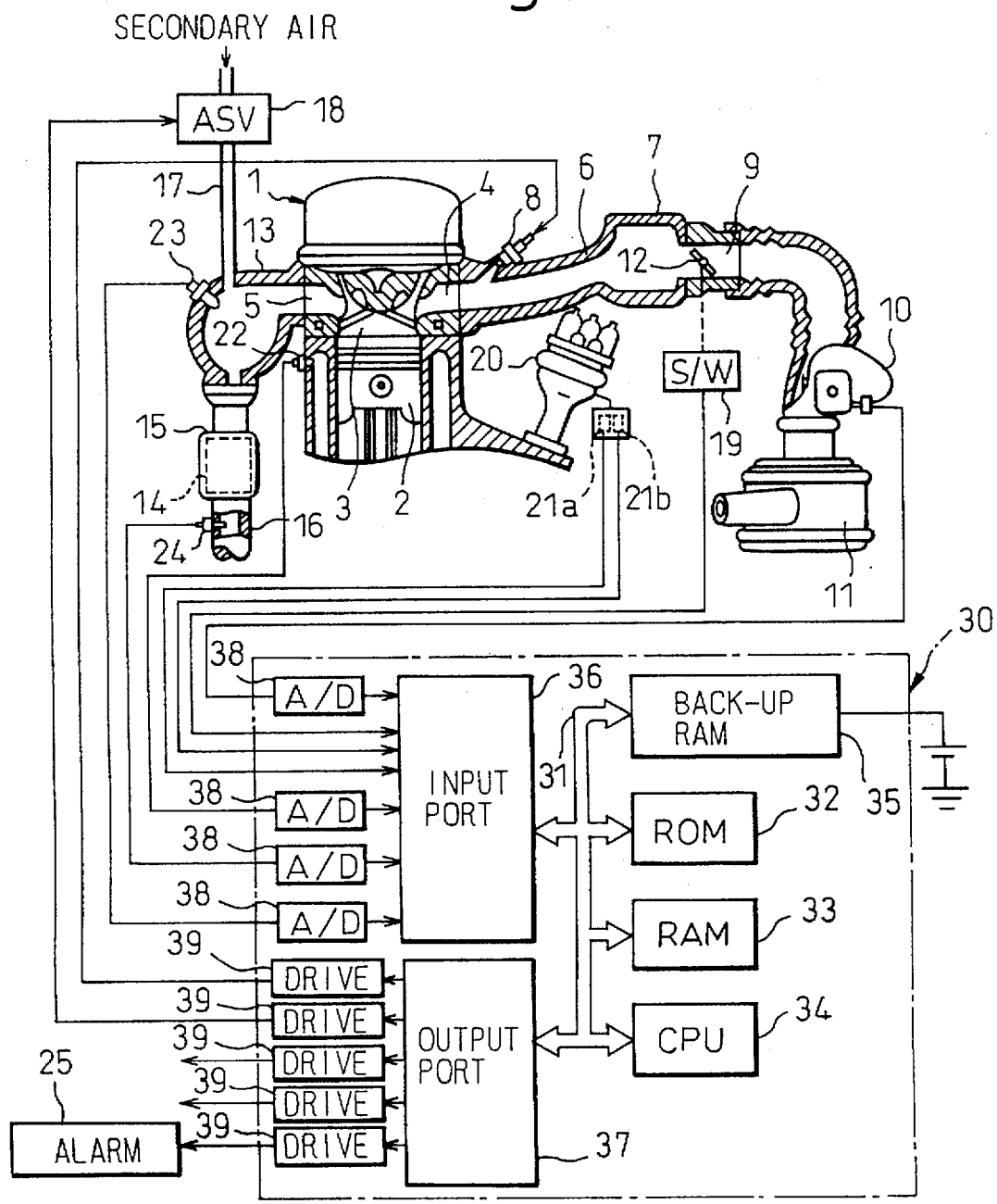
FIG. 1 is an overview of an internal combustion engine.

Referring to FIG. 1, 1 is an engine body, 2 is a piston, 3 is a combustion chamber, 4 is an intake port, and 5 is an exhaust port. The intake port 4 is connected through an intake pipe 6 to a surge tank 7. Each intake pipe 6 is provided with a fuel injector 8 injecting fuel toward the inside of the corresponding intake port 4. The surge tank 7 is connected through an intake duct 9 and air flow meter 10 to an air cleaner 11. Inside the intake duct 9 is arranged a throttle valve 12. On the other hand, the exhaust port 5 is connected to an exhaust manifold 13. This exhaust manifold 13 is connected to an exhaust pipe 16 through a catalytic converter 15 housing a three-way catalyst 14 able to simultaneously reduce the amounts of the unburnt hydrocarbons, carbon monoxide, and $NO_x$ in the exhaust gas. The exhaust manifold 13 is connected to a secondary air feed conduit 17. In the secondary air feed conduit 17 is arranged a secondary air feed control valve 18.

An electronic control unit 30 is comprised of a digital computer which is provided with a read only memory (ROM) 32, random access memory (RAM) 33, central processing unit (CPU) 34, backup RAM 35 connected at all times to a power source, input port 36, and output port 37 connected with each other by a bidirectional bus 31. The air flow meter 10 generates an output voltage proportional to the amount of intake air. This output voltage is input through the corresponding AD converter 38 to the input port 36. The throttle valve 12 is provided with an idling switch 19 which generates an LL signal showing that the throttle valve 12 is opened to the idling position. The LL signal generated by the idling switch 19 is input to the input port 36.

A distributor 20 is provided with a top dead center sensor 21a generating a signal showing that for example the no. 1 cylinder is at the top dead center of the intake stroke and a crank angle sensor 21b generating an output pulse each time the crank shaft rotates by 30 degrees. The output signal of the top dead center sensor 21a and the output pulse of the crank angle sensor 21b are input to the input port 36. In the CPU 34, the current crank angle and the engine speed are calculated from the output signal of the top dead center sensor 21a and the output pulse of the crank angle sensor 21b. The engine body 1 is provided with a temperature sensor 22 for generating an output voltage proportional to the temperature of the engine coolant. The output voltage of the temperature sensor 22 is input through the corresponding AD converter 38 to the input port 36.

Inside the exhaust manifold 13 upstream of the three-way catalyst 14 is arranged an air-fuel ratio sensor 23 for detecting the air-fuel ratio from the concentration of oxygen in the exhaust gas. Inside the exhaust pipe 16 downstream of the three-way catalyst 14 is arranged an air-fuel ratio sensor 25 for detecting the air-fuel ratio from the concentration of oxygen in the exhaust gas. Note that the air-fuel ratio sensor 23 arranged at the upstream side of the three-way catalyst 13 is referred to below as the upstream $O_2$ sensor, while the air-fuel ratio sensor 24 arranged at the downstream side of the three-way catalyst 13 is referred to as the downstream $O_2$ sensor. Inside the upstream $O_2$ sensor and the downstream $O_2$ sensor are housed electric heaters for warming up the sensors. The output signals of the $O_2$ sensors 23 and 24 are input through the corresponding AD converter 38 to the input port 36. On the other hand, the output port 37 is connected through the corresponding drive circuits 39 to the fuel injector 8, secondary air feed control valve 18, electric heater of the upstream $O_2$ sensor 23, electric heater of the downstream $O_2$ sensor 24, and alarm lamp, alarm buzzer, or other alarm device 25.

In the embodiment according to the present invention, the fuel injection time TAU is calculated based on the following equation:

$$TAU = TP \cdot FAF \cdot K + \gamma$$

Figure 2:
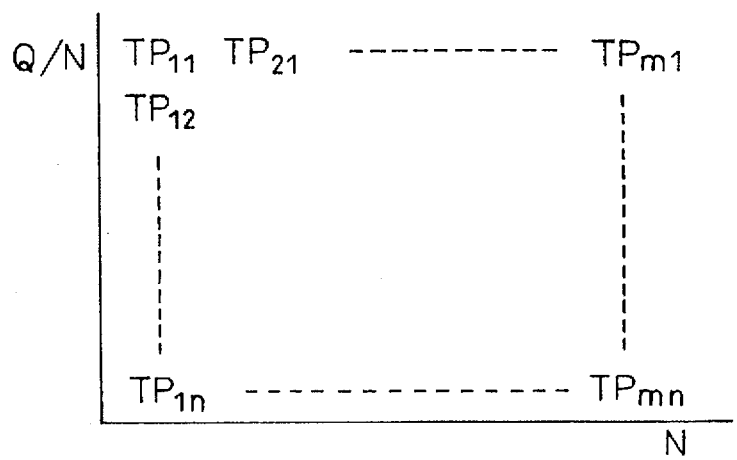
FIG. 2 is a view of a map of a basic fuel injection time TP.

Here, TP shows the basic fuel injection time, FAF the feedback correction coefficient, K the increase coefficient, and $\gamma$ the invalid injection time. The basic fuel injection time TP is the injection time required for making the air-fuel ratio the stoichiometric air-fuel ratio. This basic fuel injection time TP is found in advance by experiments as a function of the engine load Q/N (amount of intake air Q/engine speed N) and the engine speed N and is stored in advance in the ROM 32 in the form of a map as a function of the engine load Q/N and engine speed N as shown in FIG. 2.

Figure 3:
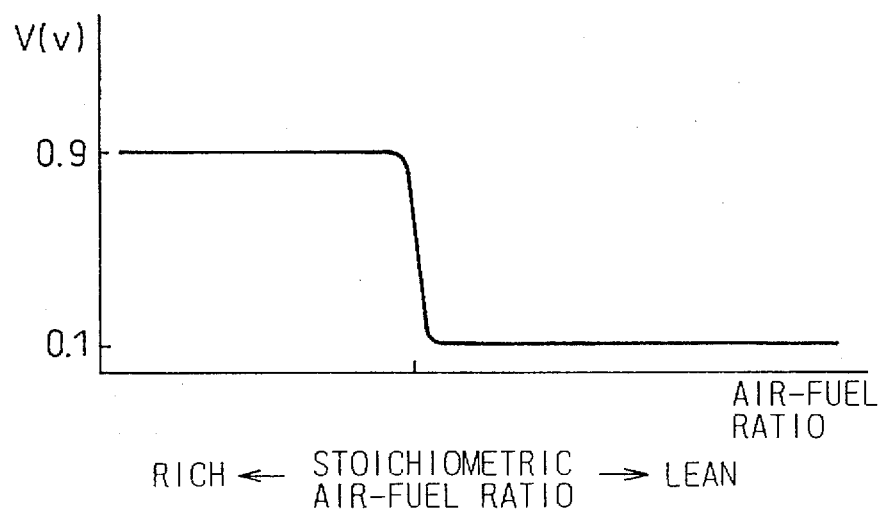
FIG. 3 is a graph of an output voltage of an $O_2$ sensor.

The feedback correction coefficient FAF is changed based on the output signal of the upstream $O_2$ sensor 23 so that the air-fuel ratio becomes the stoichiometric air-fuel ratio. This feedback correction coefficient FAF usually shifts up and down about 1.0. That is, the upstream $O_2$ sensor 23 generates an output voltage of about 0.1V when the air-fuel ratio is lean as shown in FIG. 3 and generates an output voltage of about 0.9V when the air-fuel ratio is rich. When it is judged from the output voltage of the upstream Osensor 23 that the air-fuel ratio is lean, the feedback correction coefficient FAF is increased, while when it is judged that the air-fuel ratio is rich, the feedback correction coefficient FAF is reduced. As a result, the air-fuel ratio is controlled to the stoichiometric air-fuel ratio.

Note that in this embodiment of the present invention, the feedback correction coefficient FAF is further controlled based on the output signal of the downstream $O_2$ sensor 24. That is, when the center of fluctuation of the air-fuel ratio at the upstream side of the three-way catalyst 14 is off from the stoichiometric air-fuel ratio, the feedback correction coefficient FAF is judged based on the output signal of the downstream $O_2$ sensor 24 so that the center of fluctuation of the air-fuel ratio at the upstream side of the three-way catalyst 14 becomes close to the stoichiometric air-fuel ratio. The downstream $O_2$ sensor 24 also generates an output voltage V of about 0.1V when the air-fuel ratio is lean and generates an output voltage V of about 0.9V when the air-fuel ratio is rich as shown in FIG. 3.

The increase coefficient K is usually fixed to 1.0. When the fuel is to be increased, that is, when the air-fuel ratio is to be made rich, it becomes a value larger than 1.0.

Figure 4:
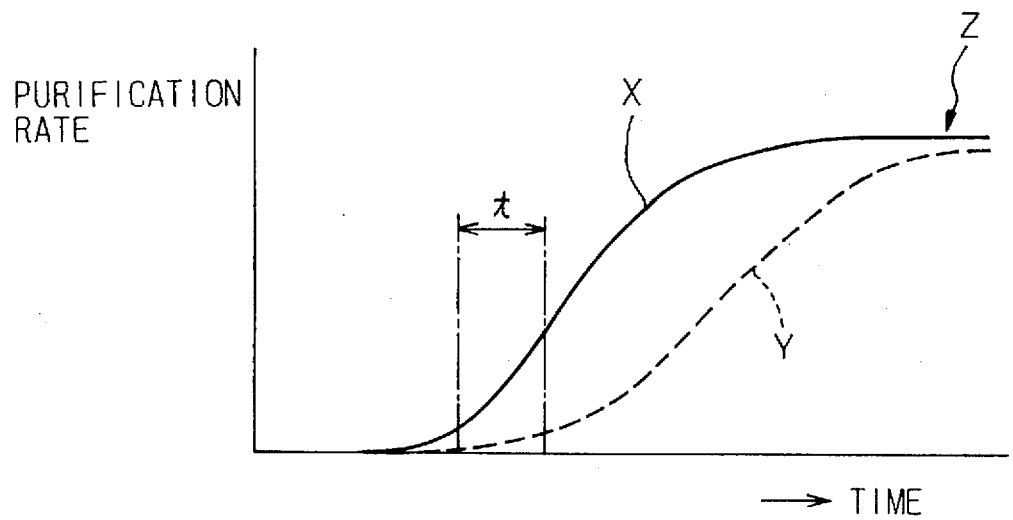
FIG. 4 is a view of the changes in an exhaust gas purification rate.

However, as explained above, there is the advantage that it is possible to detect deterioration of the three-way catalyst 14 early if starting the judgement of deterioration of the three-way catalyst 14 during the warmup operation. However, if starting the judgement of deterioration of the three-way catalyst 14 during the warmup operation, there is a far greater advantage than this advantage. This will be explained next with reference to FIG. 4. FIG. 4 shows the purification rate of exhaust gas by the three-way catalyst 14 which changes along with the elapse of time after engine startup. Here, the curve X shows the change of the purification rate of exhaust gas when the three-way catalyst 14 has not deteriorated at all, while the curve Y shows the changes in the purification rate of exhaust gas when the three-way catalyst 14 has deteriorated just slightly.

The three-way catalyst gradually rises in temperature along with the elapse of time after engine startup. As a result, the purification rate of the exhaust gas rises along with the elapse of time as shown in FIG. 4. Next, when the three-way catalyst 14 finishes being warmed up, as shown by Z in FIG. 4, the three-way catalyst 14 maintains a predetermined purification rate. As explained above, the curve Y shows the case where the three-way catalyst 14 deteriorates just slightly. Accordingly, when the three-way catalyst 14 finishes warming up, the difference between the curve X and the curve Y becomes considerably smaller. However, as an actual problem, it is considerably difficult to accurately detect such a small difference of the purification rates. Accordingly, it is close to impossible to detect slight deterioration of the three-way catalyst 14 after the three-way catalyst 14 finishes warming up.

However, even if the three-way catalyst 14 deteriorates just slightly, the difference between the curve X and the curve Y is manifested large as shown in FIG. 4 for a while after the purification rate of the three-way catalyst 14 starts to rise. That is, the reason for the deterioration of the three-way catalyst 14 is mainly the poisoning action and overheating action. In this case, the catalyst poisons contained in the exhaust gas mainly adhere to the upstream end of the three-way catalyst 14, so the deterioration caused by the poisoning action occurs at the upstream end of the three-way catalyst 14. Accordingly, the deterioration due to the overheating action also occurs at the upstream end of the three-way catalyst 14. Since the deterioration of the three-way catalyst 14 occurs locally in this way, even if the degree of deterioration of the three-way catalyst 14 as a whole is small, the degree of deterioration of the upstream end of the three-way catalyst 14 becomes considerably large.

On the other hand, when the three-way catalyst 14 starts to warm up after engine startup, the three-way catalyst 14 rises in temperature first at the upstream end and therefore the upstream end first reaches the activation temperature where the exhaust gas can be purified. That is, when the three-way catalyst 14 starts to be warmed up, the action of purifying the exhaust gas starts at the upstream end of the three-way catalyst 14 first. Accordingly, the purification rate of the exhaust gas when the three-way catalyst 14 starts to warm up is governed by the degree of deterioration of the upstream end of the three-way catalyst 14. Therefore, even if the degree of deterioration of the three-way catalyst 14 as a whole is slight, there is a large difference between the curve X and the curve Y as shown in FIG. 4 for a while after the purification rate of the three-way catalyst 14 starts rising. Therefore, if the degree of deterioration is found from the difference between the curve X and the curve Y within the time t of FIG. 4 where the difference between the curve X and the curve Y is large, it becomes possible to accurately detect the degree of deterioration of the three-way catalyst 14. Accordingly, in this embodiment of the present invention, the deterioration of the three-way catalyst 14 is judged within the time t of FIG. 4 where the difference between the curve X and the curve Y is large.

On the other hand, if the $O_2$ sensors 23 and 24 are not sufficiently warmed up, they will not produce output signals representative of the air-fuel ratio. Therefore, time is required until the $O_2$ sensors 23 and 24 produce output signals representative of the air-fuel ratio after engine startup. In this case, the upstream $O_2$ sensor 23 is designed to produce a correct output signal, that is, to be activated, in a relatively short time, so further time is required for the downstream $O_2$ sensor to be activated. However, when judging the deterioration of the three-way catalyst 14 based on the output signal of the downstream $O_2$ sensor, the downstream $O_2$ sensor must be activated when judging the deterioration. Therefore, when judging the deterioration within the time t of FIG. 4, the downstream $O_2$ sensor must be activated before reaching the time t. Therefore, in this embodiment of the present invention, the downstream $O_2$ sensor is designed to be able to be heated by an electric heater.

That is, in this embodiment of the present invention, the electric heater of the downstream $O_2$ sensor heats up over a predetermined time from the start of the engine. The amount of power supplied at this time is set so that the downstream $O_2$ sensor will activate within the time t of FIG. 4. Note that the upstream $O_2$ sensor 23 also may be heated by its electric heater in accordance with need.

Figure 5:
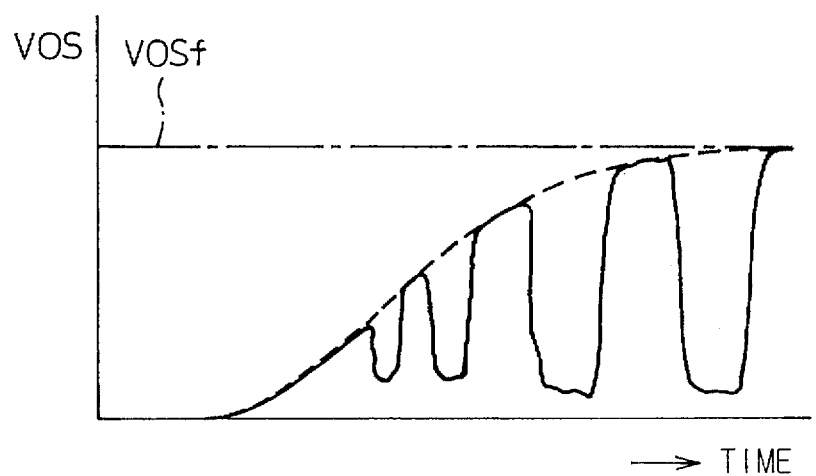
FIG. 5 is a view of changes in am output voltage VOS of a downstream $O_2$ sensor.

FIG. 5 shows the output voltage VOS of the downstream $O_2$ sensor which changes together with the elapse of time after engine startup. As shown in FIG. 5, if the downstream $O_2$ sensor is activated, the output voltage VOS starts fluctuating up and down in accordance with the air-fuel ratio controlled based on the output signal of the upstream $O_2$ sensor 23. When the downstream $O_2$ sensor is completely warmed up, the maximum value of the upwardly and downwardly fluctuating output voltage VOS becomes the predetermined value $VOS_f$. Before the downstream $O_2$ sensor 24 completely warms up, the maximum value of the output voltage VOS is smaller than the predetermined value $VOS_f$ and the maximum value and amplitude of the output voltage VOS gradually increase along with the elapse of time. In this embodiment of the present invention, the case is shown where the judgement of deterioration of the three-way catalyst 14 is performed within the time t of FIG. 4 before the maximum value of the output voltage VOS of the downstream $O_2$ sensor 24 reaches $VOS_f$.

Next, an explanation will be made of the routine for control of the feedback of the air-fuel ratio based on the output signal of the upstream $O_2$ sensor 23 referring to FIG. 6 and FIG. 7. Note that this routine is executed by interruption every predetermined time period, for example, every 4 ms.

Figure 6:
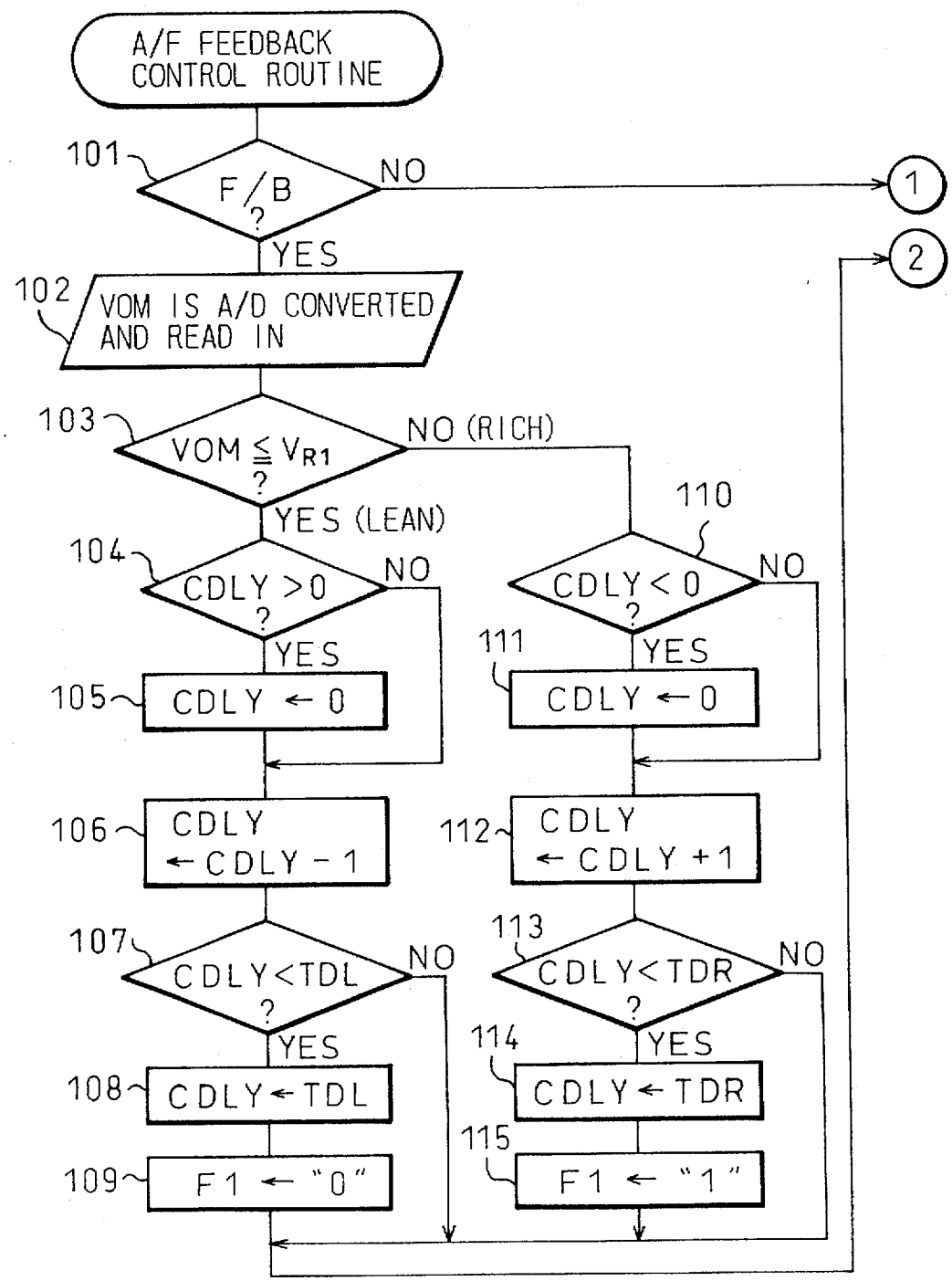
FIGS. 6 and 7 are flow charts of the feedback control of the air-fuel ratio.
Figure 7:
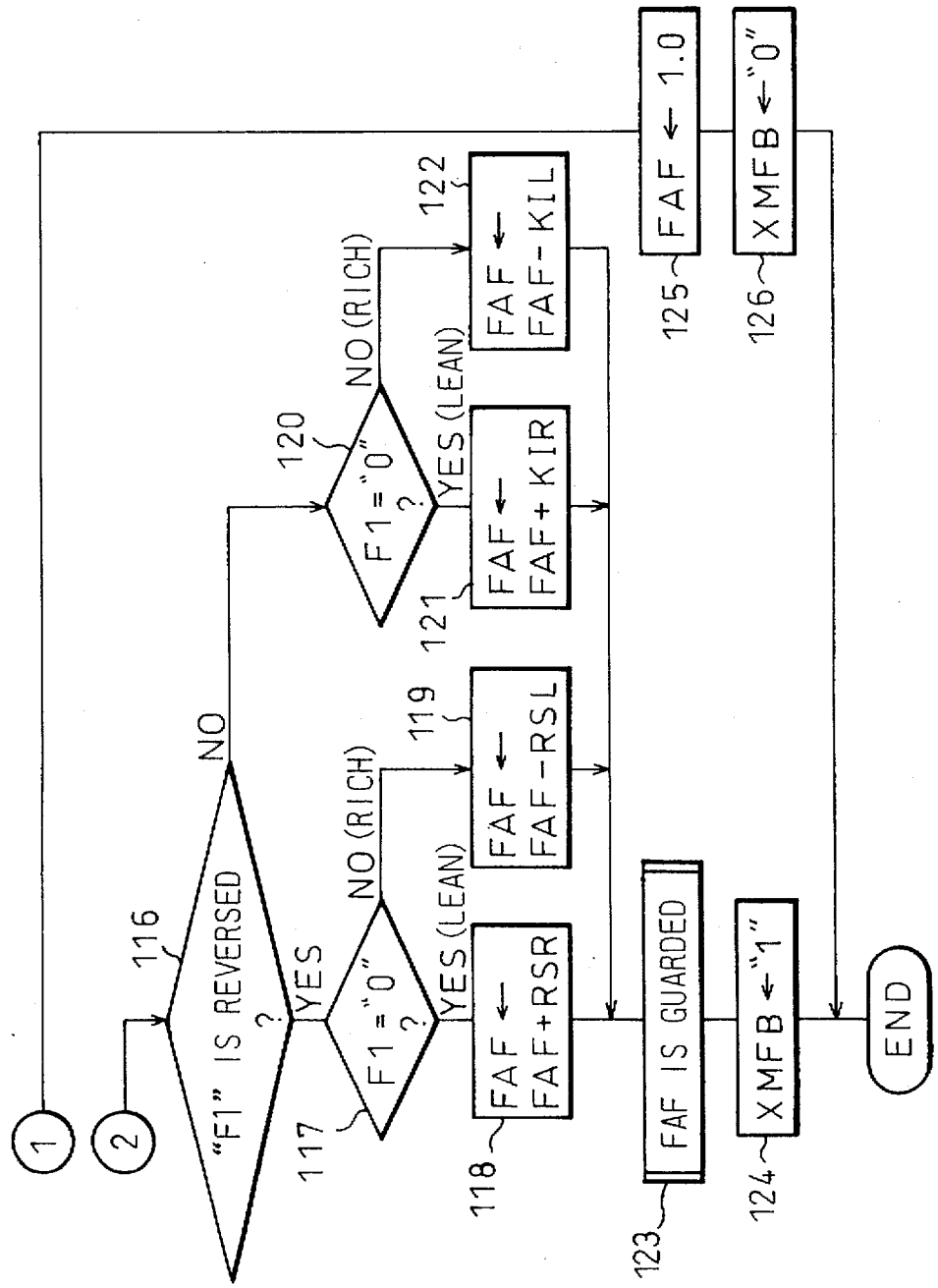

Referring to FIG. 6 and FIG. 7, first, at step 101, it is judged if the feedback conditions of the air-fuel ratio by the upstream $O_2$ sensor 23 are satisfied or not. It is judged that the feedback conditions are not satisfied when the temperature of the engine coolant is less than the set value, during engine startup, increasing injection immediately after startup, increasing injection during warmup, increasing injection during power operation, increasing injection for preventing catalyst overheating, when the upstream $O_2$ sensor 23 is not activated, and when fuel injection is stopped during deceleration. When the feedback conditions are not satisfied, the routine proceeds to step 125, where the feedback correction coefficient FAF is made 1.0, then at step 126, the air-fuel ratio feedback flag XMFB is made "0". As opposed to this, when the feedback conditions are satisfied, the routine proceeds to step 102. Note that usually the upstream $O_2$ sensor 23 is activated before the three-way catalyst 14 is activated, that is, before the purification rate of the exhaust gas starts to rise in FIG. 4.

At step 102, the output VOM of the upstream $O_2$ sensor 23 is converted from an analog to digital format and fetched, then at step 103 it is judged if the air-fuel ratio is rich or lean based on whether the VOM is lower than the relative voltage $V_{R1}$. This relative voltage $V_{R1}$ is made the voltage of the center of amplitude of the $O_2$ sensor output and in this embodiment is $V_{R1}=0.45V$. When it is judged at step 103 that the air-fuel ratio is lean (VOM≤$V_{R1}$), the routine proceeds to step 104, where it is judged if the delay counter CDLY is positive or not. If CDLY>0, then at step 105 CDLY is made 0, then the routine proceeds to step 106. At step 106, the delay counter CDLY is decremented by exactly "1", then at steps 107 and 108, the delay counter CDLY is guarded by the minimum value TDL. In this case, when the delay counter CDLY reaches the minimum value TDL, the air-fuel ratio flag F1 is made "0" (lean) at step 109. Note that this minimum value TDL is a negative value.

On the other hand, when it is judged at step 103 that the air-fuel ratio is rich (VOM>$V_{R1}$), the routine proceeds to step 110, where it is judged if the delay counter CDLY is negative. If CDLY<0, then the CDLY is made 0 at step 111, then the routine proceeds to step 112. At step 112, the delay counter CDLY is incremented by exactly "1", then at steps 113 and 114; the delay counter CDLY is guarded by the maximum value TDR. In this case, when the delay counter CDLY reaches the maximum value TDR, the air-fuel ratio flag F1 is made "1" (rich) at step 115. Note that this maximum value TDR is a positive value.

Next, at step 116, it is judged if the sign of the air-fuel ratio flag F1 has inverted or not. When the sign of the air-fuel ratio flag F1 is inverted, the routine proceeds to step 117, where it is judged if the ratio inverted from rich to lean or inverted from lean to rich based on the value of the air-fuel ratio flag F1. If inverted from rich to lean, at step 118, FAF is increased in skips as FAF←FAF+RSR, while as opposed to this, if inverted from lean to rich, at step 119, the FAF is reduced in skips as FAF←FAF−RSL. That is, the skip processing is performed.

On the other hand, when it is judged at step 116 that the sign of the air-fuel ratio flag F1 has not been inverted, processing for integration is performed at steps 120, 121, and 122. That is, at step 120, it is judged if F1="0". If F1="0" (lean), then at step 121, FAF←FAF+KIR, while if F1="1" (rich), at step 122, FAF←FAF−KIL. Here, the integration constants KIR and KIL are set sufficiently smaller than the skip amounts RSR and RSL so that KIR (KIL)<RSR (RSL). When F1="0" (lean) due to this integration processing, the amount of fuel injection is gradually increased, while when F1="1" (rich), the amount of fuel injection is gradually reduced.

Next, at step 123, the feedback correction coefficient FAF computed at steps 118, 119, 121, and 122 is guarded by the minimum value, for example, 0.8 or guarded by the maximum value, for example, 1.2. Due to this, when for some reason or another the feedback correction coefficient FAF becomes too large or too small, the air-fuel ratio of the engine is kept from fluctuating and thereby the air-fuel ratio is prevented from becoming overly rich or overly lean. Next, at step 124, the air-fuel ratio feedback flag XMFB is made "1".

Figure 8:
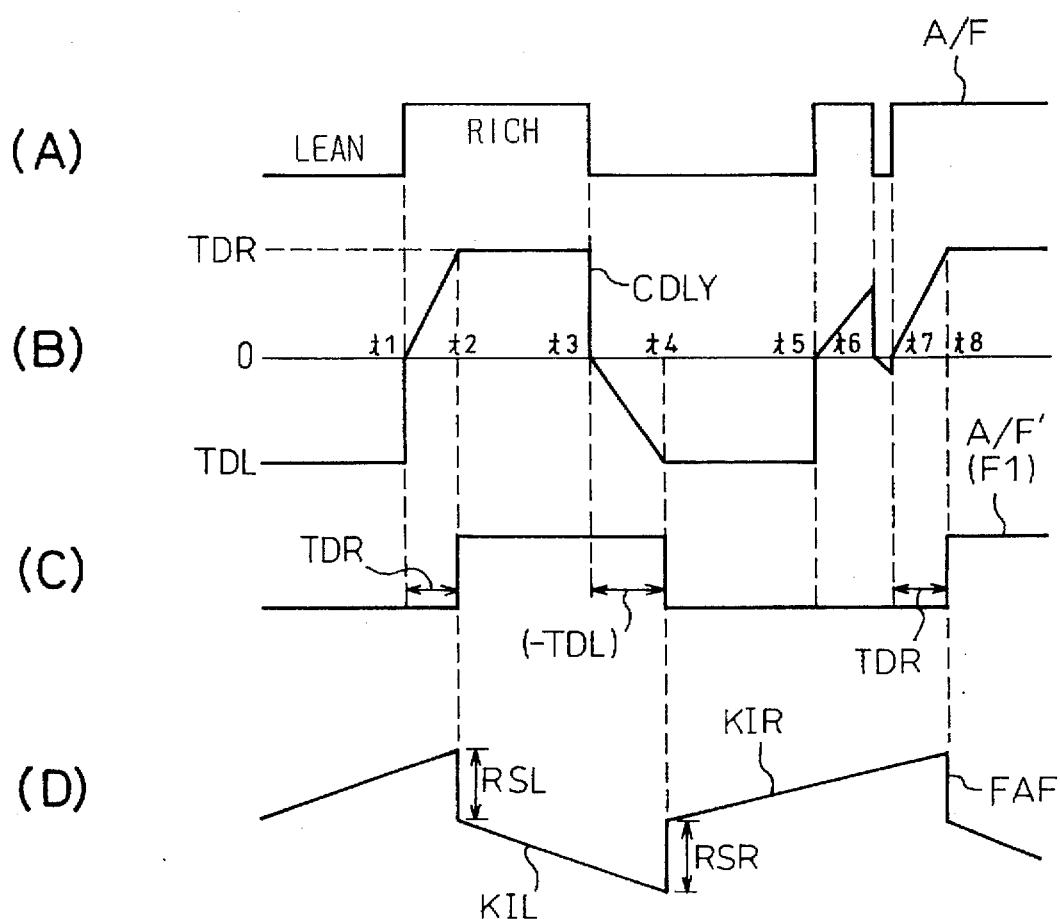
FIG. 8 is a time chart of changes in the values involved in the feedback control.

FIG. 8 is a timing chart for explaining the operation by the flow charts of FIG. 6 and FIG. 7. If the rich and lean judgement air-fuel ratio signal A/F shown in FIG. 8(A) is obtained from the output VOM of the upstream $O_2$ sensor 23, the delay counter CDLY is counted up in the rich state and counted down in the lean state as shown in FIG. 8(B). As a result, as shown in FIG. 8(C), the delayed air-fuel ratio signal A/F' (corresponding to the flag F1) is formed. For example, even if the air-fuel ratio signal A/F is changed from lean to rich at the time $t_1$, the air-fuel ratio signal A/F' is kept lean for exactly the rich delay time TDR, then is changed to rich at the time $t_2$. Further, even if the air-fuel ratio A/F is changed from rich to lean at the time $t_3$, the air-fuel ratio signal A/F' is kept rich for exactly the lean delay time (−TDL), then changed to lean at the time $t_4$. However, if the air-fuel ratio signal A/F is inverted in a shorter time than the rich delay time TDR as shown by the times $t_5$, $t_6$, and $t_7$, it will take time for the delay counter CDLY to reach the maximum value TRD and, as a result, the air-fuel ratio signal A/F' will be inverted at the time $t_8$. That is, the delayed air-fuel ratio signal A/F' becomes stable compared with the air-fuel ratio signal A/F before the delay processing. In this way, a feedback correction coefficient FAF shown in FIG. 8(D) is obtained based on the delayed and stabilized air-fuel ratio signal A/F'.

Next, an explanation will be made of the second air-fuel ratio feedback control by the downstream $O_2$ sensor 24. As the second air-fuel ratio feedback control, there is the system of controlling the constants involved in the first air-fuel ratio feedback control, that is, the skip amounts RSR and RSL, the integration constants KIR and KIL, the delay times TDR and TDL, or the relative voltage $V_{R1}$ of the upstream $O_2$ sensor 23 and the system of introducing a second air-fuel ratio correction coefficient FAF2.

For example, when the rich skip amount RSR is made larger, the control air-fuel ratio can be shifted to the rich side. Further, even when the lean skip amount RSL is made small, the control air-fuel ratio can be shifted to the rich side. On the other hand, when the lean skip amount RSL is made larger, the control air-fuel ratio can be shifted to the lean side. Further, even when the rich skip amount RSR is made small, the control air-fuel ratio can be shifted to the lean side. Accordingly, it is possible to control the air-fuel ratio by correcting the rich skip amount RSR and lean skip amount RSL in accordance with the output of the downstream $O_2$ sensor 24. Further, if the rich integration constant KIR is made larger, the control air-fuel ratio can be shifted to the rich side. Further, even when the lean integration constant KIL is made small, the control air-fuel ratio can be shifted to the rich side. On the other hand, if the lean integration constant KIL is made large, the control air-fuel ratio can be shifted to the lean side. Further, even if the rich integration constant KIR is made smaller, the control air-fuel ratio can be shifted to the lean side. Accordingly, by correcting the rich integration constant KIR and the lean integration constant KIL in accordance with the output of the downstream $O_2$ sensor 24, it becomes possible to control the air-fuel ratio. Further, if the rich delay time TDR is made larger or the lean delay time (−TDL) is made smaller, the control air-fuel ratio can be shifted to the rich side, while if the lean delay time (−TDL) is made larger or the rich delay time (TDR) is made smaller, the control air-fuel ratio can be shifted to the lean side. That is, by correcting the delay times TDR, TDL in accordance with the output VOS of the downstream $O_2$ sensor VOS, it becomes possible to control the air-fuel ratio. Further, if the relative voltage $V_{R1}$ is made larger, the control air-fuel ratio can be shifted to the rich side, while when the relative voltage $V_{R1}$ is made smaller, the control air-fuel ratio can be shifted to the lean side. Accordingly, by correcting the relative voltage $V_{R1}$ in accordance with the output VOS of the downstream $O_2$ sensor 24, it becomes possible to control the air-fuel ratio.

There are advantages to controlling the skip amount, integration constant, delay time, and relative voltage by the downstream $O_2$ sensor 24. For example, by controlling the delay time, it becomes possible to extremely finely adjust the air-fuel ratio, while by controlling the skip amount, control with a good response becomes possible without lengthening the feedback period of the air-fuel ratio. Note that these control amounts can naturally be used in combination.

Next, an explanation will be made of the double $O_2$ sensor system designed to control the amount of skip as a constant involved in the air-fuel ratio feedback control.

Figure 9:
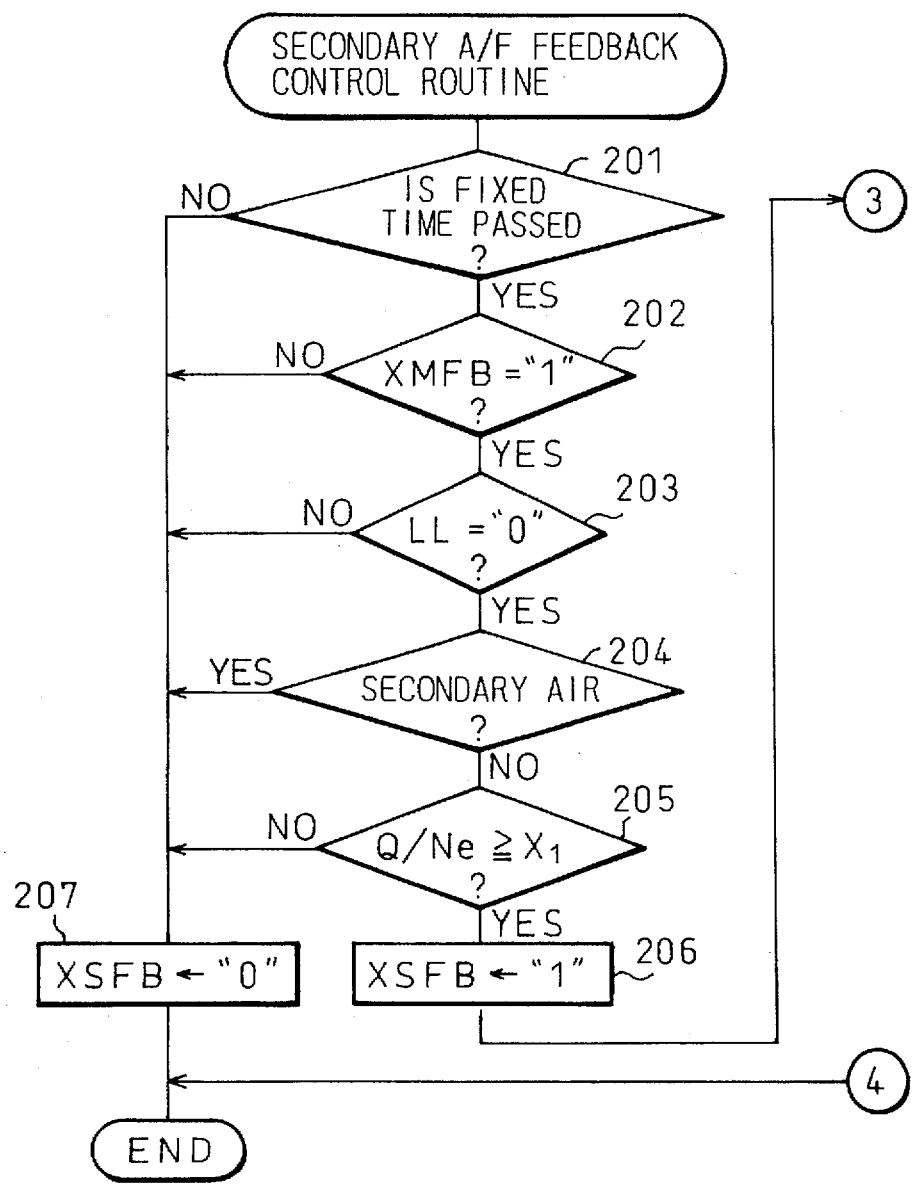
FIGS. 9 and 10 are flow charts of the second feedback control of the air-fuel ratio.
Figure 10:
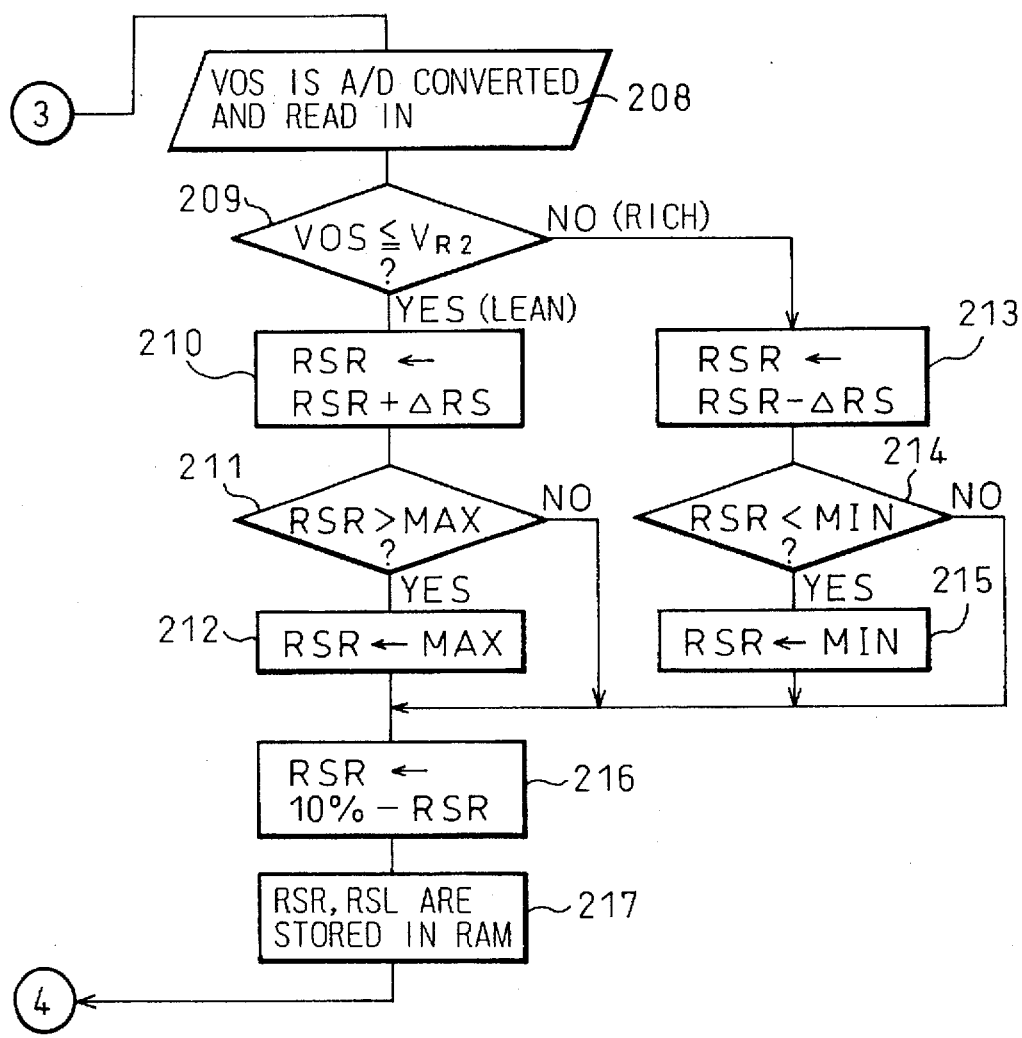

FIG. 9 and FIG. 10 show the second air-fuel ratio feedback control routine based on the output VOS of the downstream $O_2$ sensor 24 executed by interruption every predetermined time interval, for example, 512 ms.

Referring to FIG. 9 and FIG. 10, first, at step 201, it is judged if a predetermined time has elapsed from engine startup. This predetermined time shows the time under the downstream $O_2$ sensor 24 produces an output signal showing the air-fuel ratio. When the predetermined time has not elapsed, the routine proceeds to step 207, where the air-fuel ratio feedback flag XSFB is reset ("0"). As opposed to this, when the predetermined time has elapsed, the routine proceeds to step 202, where it is judged if the air-fuel ratio feedback flag XMFB is "1" or not, that is, if air-fuel ratio feedback control is being performed by the upstream $O_2$ sensor 23. Usually, XMFB="1", so the routine proceeds to step 203.

From step 203 to 205, it is judged if the conditions for feedback by the upstream $O_2$ sensor 23 are satisfied or not. For example, when the throttle valve 12 is open to the idling position (LL="1") (step 203), when the secondary air is introduced based on the engine speed, vehicle speed, signal LL of the idle switch 19, coolant temperature THW, etc. (step 204), when the load is light (Q/N<$X_1$) (step 205), it is judged that the conditions for feedback are not satisfied, while in other cases, it is judged that the conditions for feedback are satisfied. When the conditions for feedback are not satisfied, the routine proceeds to step 207, while when the conditions for feedback are satisfied, the routine proceeds to step 206, where the air-fuel ratio feedback flag XSFB is set ("1"), then the routine proceeds to step 208.

At step 208, the output VOS of the downstream $O_2$ sensor 24 is converted from an analog to digital format and fetched, then at step 209, it is judged if the VOS is less than the relative voltage $V_{R2}$ (for example, $V_{R2}$=0.55V) or not, that is, if the air-fuel ratio is rich or lean. When it is judged at step 209 that VOS≦$V_{R2}$ (lean), the routine proceeds to steps 210, 211, and 212, while when it is judged that VOS>$V_{R2}$ (rich), the routine proceeds to steps 213, 214, and 215. That is, at step 210, RSR←RSR+ΔRS (constant value), that is, the amount of rich skip RSR is increased to make the air-fuel ratio shift to the rich side, then at steps 211 and 212 the RSR is guarded by the maximum value MAX (=7.5%). On the other hand, at step 213, RSR←RSR–ΔRS, that is, the amount of rich skip RSR is reduced to shift the air-fuel ratio to the lean side, then at steps 214 and 215, RSR is guarded by the minimum value MIN (=2.5%).

Next, at step 216, the amount of rich skip RSL is made RSL←10%–RSR. That is, RSR+RSL=10%. Next, at step 217, the skip amounts RSR and RSL are stored in the RAM 33.

Figure 11:
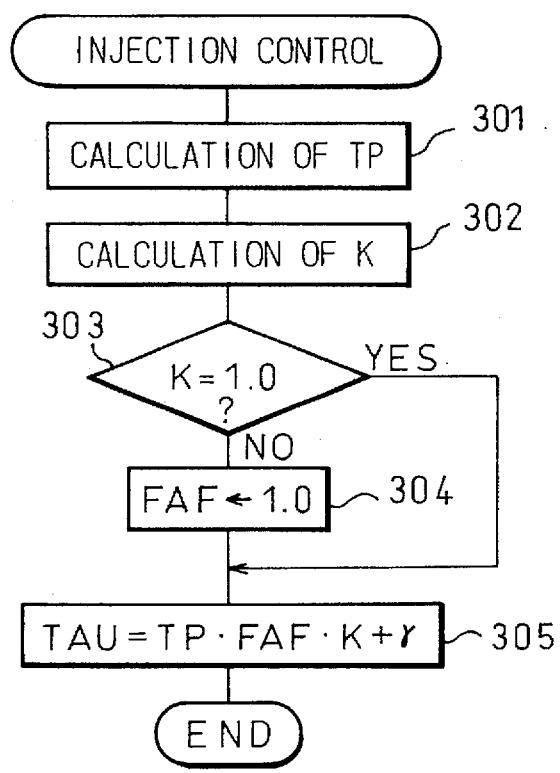
FIG. 11 is a flow chart of the control of the fuel injection.

FIG. 11 is a routine for control of the fuel injection executed by interruption every predetermined crank angle for example.

Referring to FIG. 11, first, at step 301, the basic fuel injection time TP is calculated from the map shown in FIG. 2. Next, at step 302, the value of the correction coefficient K determined from the operating state of the engine is calculated. Next, at step 303, it is judged if the value of the correction coefficient K is 1.0 or not. When K=1.0, the routine jumps to step 305. As opposed to this, when K is not equal to 1.0, the routine proceeds to step 304, where the feedback correction coefficient FAF is fixed to 1.0, then the routine proceeds to step 305. At step 305, the fuel injection time TAU (=TP·FAF·K+γ) is calculated.

Next, an explanation will be made of the basic method for judgement of the deterioration of the three-way catalyst 14 used in the present invention referring to FIG. 12A to FIG. 14C.

Figure 12A:
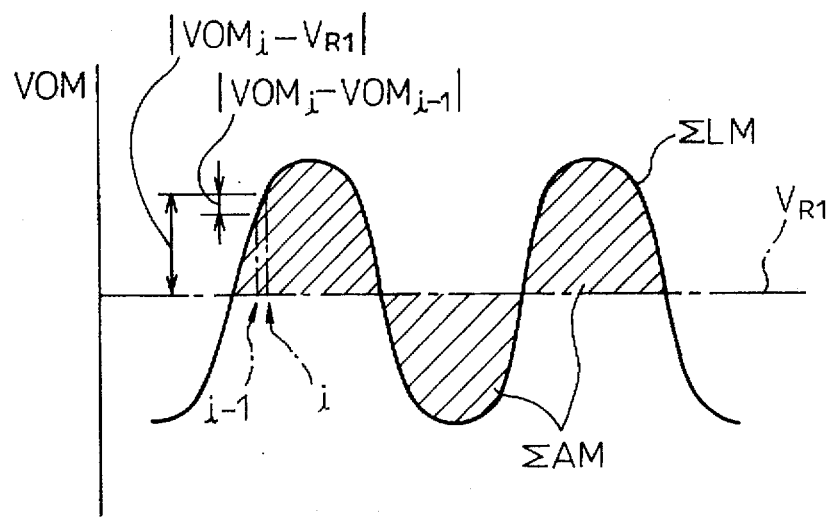
FIGS. 12A and 12B are views explaining the "length of the output signal response curve" and "area surrounded by the output signal response curve and a reference value line" of the output voltage of the $O_2$ sensor.
Figure 12B:
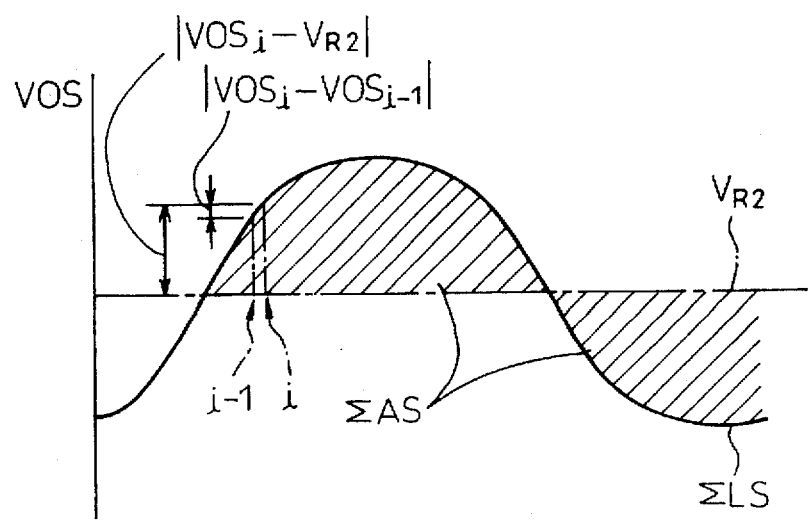

FIG. 12A shows the output voltage VOM of the upstream 02 sensor 23 when feedback control of the air-fuel ratio is performed. FIG. 12B shows the output voltage VOS of the downstream $O_2$ sensor 24 when feedback control of the air-fuel ratio is performed. In the method of judgement of deterioration of the three-way catalyst 14 used in the present invention, the concepts of the length of the output signal response curve of the $O_2$ sensors 23 and 24 and the area surrounded by the output signal response curve and the reference value line of the $O_2$ sensors 23 and 24 were introduced. Here, the "length of the output signal response curve" of the $O_2$ sensors 23 and 24 means the length of the curve of change of the output voltage VOM and VOS when taking the output voltages VOM and VOS on the vertical axis and time on the horizontal axis as shown in FIG. 12A and FIG. 12B.

In the embodiments of the present invention, as the value representing the length of the output signal response curve, use is made of the cumulative value of the amount of change of the output voltages VOM and VOS of the upstream $O_2$ sensors 23 and 24 per predetermined time. That is, the length ΣLM of the output of the upstream $O_2$ sensor 23, as shown in FIG. 12A, is expressed by the cumulative value of the absolute value $|VOM_i-VOM_{i-1}|$ of the difference between the output voltage $VOM_{i-1}$ at the time i-1 and the output voltage $VOM_i$ at the time i, while the length ΣLS of the output of the downstream $O_2$ sensor 24, as shown in FIG. 12B, is expressed by the cumulative value of the absolute value $|VOS_i-VOS_{i-1}|$ of the difference between the output voltage $VOS_{i-1}$ at the time i-1 and the output voltage $VOS_i$ at the time i.

On the other hand, the "area" of the output of the $O_2$ sensors 23 and 24 means, as shown in FIG. 12A and FIG. 12B, the area shown by the hatching enclosed by the output voltages VOM and VOS and the relative voltages and $V_{R2}$ when taking the output voltages VOM and VOS on the vertical axis and taking time on the horizontal axis. In the embodiments of the present invention, as the value representing this area, use is made of the cumulative value of the difference between the output voltages VOM and VOS and relative voltages $V_{R1}$ and $V_{R2}$ of the $O_2$ sensors 23 and 24 for each predetermined time. That is, the area ΣAM of the output of the upstream $O_2$ sensor 23 is expressed by the cumulative value of the absolute value $|VOS_i-V_{R1}|$ of the difference between the output voltage $VOS_i$ and the relative voltage $V_{R1}$ at each time as shown in FIG. 12A, while the area ΣAS of the output of the downstream $O_2$ sensor 24 is expressed by the cumulative value of the absolute value $|VOS_i-V_{R2}|$ of the difference between the output voltage $VOS_i$ and the relative voltage $V_{R2}$ at each time as shown in FIG. 12B.

Figure 13:
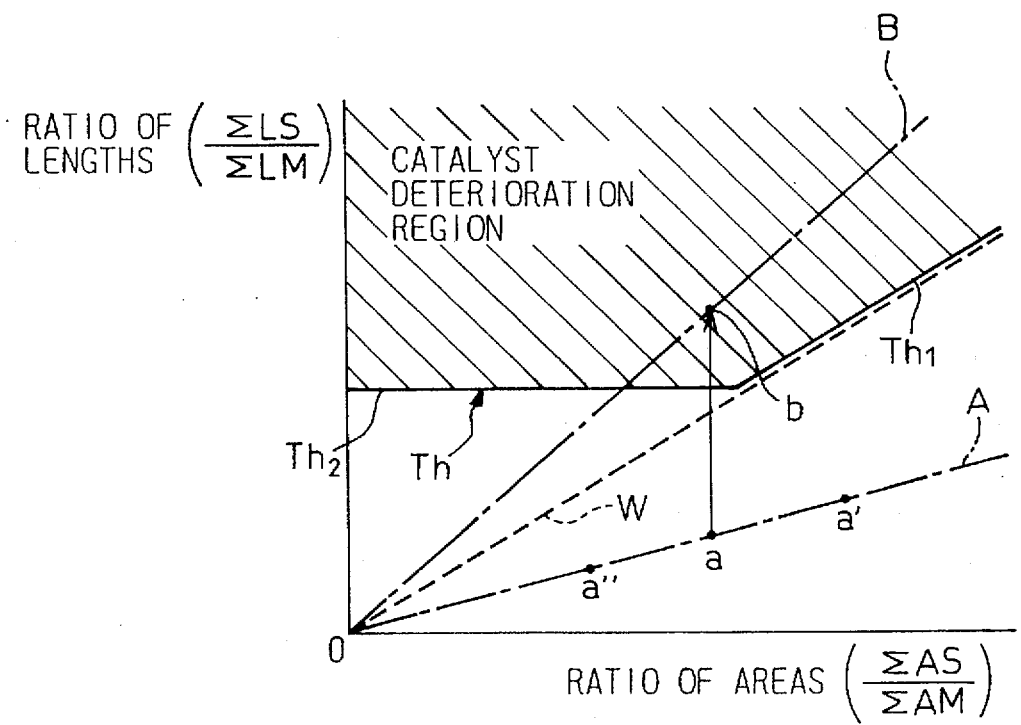
FIG. 13 is a view of the region of deterioration of the catalyst.

Further, the ratio between the length ΣLS of the output of the downstream $O_2$ sensor 24 and the length ΣLM of the output of the upstream $O_2$ sensor 23 (ΣLS/ΣLM) is defined as the ratio of length and the ratio between the area ΣAS of the output of the downstream $O_2$ sensor 24 and the area ΣAM of the output of the upstream $O_2$ sensor 23 (ΣAS/ΣAM) is defined as the ratio of area. Using the ratio of length and the ratio of area and taking the ratio of length (ΣLS/ΣLM) on the vertical axis and the ratio of area (ΣAS/ΣAM) on the horizontal axis as shown in FIG. 13, basically it can be judged that the three-way catalyst 14 is not deteriorated in the region below the broken line W shown in FIG. 13 and that the three-way catalyst 14 has deteriorated in the region above the broken line W. Next, this will be explained referring to FIG. 14A to FIG. 14C.

Figure 14A:
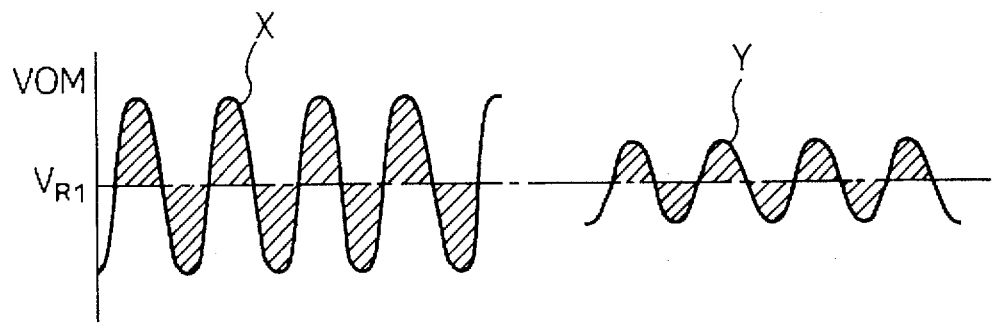
FIGS. 14A, 14B, and 14C are views of the changes in the output voltage of the $O_2$ sensor.

The curve X of FIG. 14A shows the change in the output voltage VOM of the upstream $O_2$ sensor 23 in the case where the upstream $O_2$ sensor 23 has not deteriorated. The curve X of FIG. 14B and the curve X of FIG. 14C show the change in the output voltage VOS of the downstream $O_2$ sensor 24 in the case where the downstream $O_2$ sensor 24 has not deteriorated and further the three-way catalyst 14 has not deteriorated in this way, the relationship between the ratio of area and the ratio of length when neither of the $O_2$ sensors 23 and 24 has deteriorated and further the three-way catalyst 14 has not deteriorated either is shown by the point a of FIG. 13.

Now, if the upstream $O_2$ sensor 23 has deteriorated, the amplitude of the output voltage VOM of the upstream $O_2$ sensor 23 becomes smaller as shown by the curve Y of FIG. 14A. At this time, as understood from the curve X and curve Y of FIG. 14A, the length ΣLM of the output becomes small and the area ΣAM of the output becomes small in proportion to this. Accordingly, the ratio of length becomes larger and the ratio of area becomes larger in proportion to this. Therefore, at this time, the point a of FIG. 13 shifts to the point a'.

Figure 14B:
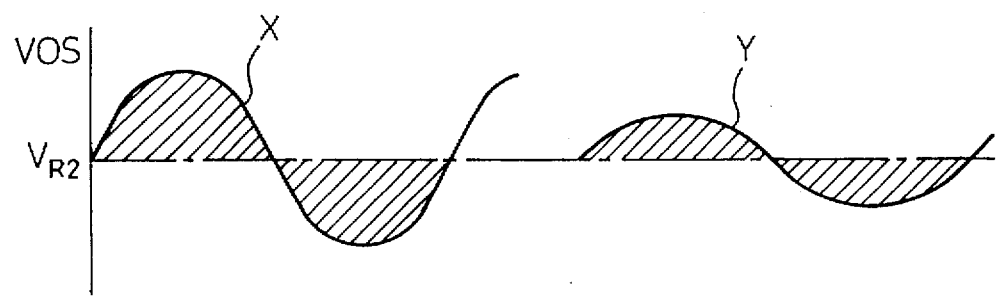
Figure 14C:
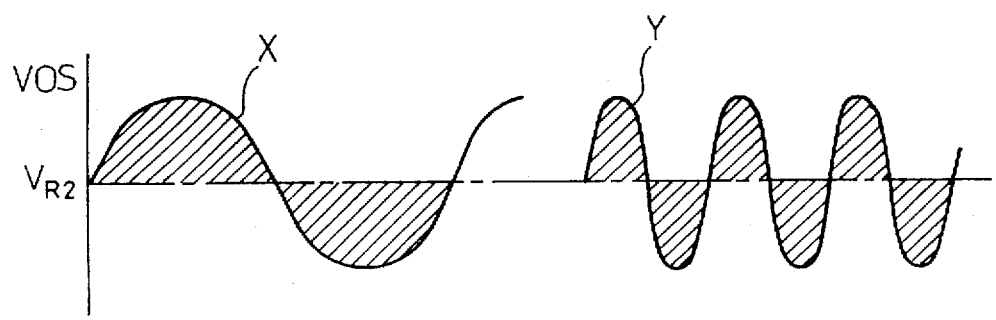

As opposed to this, if it is assumed that the downstream $O_2$ sensor 24 has deteriorated, the amplitude of the output voltage VOS of the downstream $O_2$ sensor 24 becomes smaller as shown by the curve Y in FIG. 14B. At this time, as will be understood from the curve X and the curve Y of FIG. 14B, when the length ΣLS of the output becomes small, the area ΣAS of the output becomes smaller as well in proportion to this. Accordingly, at this time, the ratio of length becomes smaller, the ratio of area becomes smaller in proportion to this, and therefore at this time the point a of FIG. 13 shifts to the point a".

In this way, when the $O_2$ sensors 23 and 24 deteriorate, the point showing the ratio of length and ratio of area shifts on the line A passing through the origin O.

On the other hand, when the three-way catalyst 14 deteriorates, the action of oxidation of the unburnt hydrocarbons and carbon monoxide and the action of reduction of the $NO_x$ based on the $O_2$ storage function are no longer sufficiently performed, so the air-fuel ratio on the downstream side of the three-way catalyst 14 fluctuates with a shorter period. In this case, the more the three-way catalyst 14 is deteriorated, the shorter the period of fluctuation of the output voltage VOS of the downstream $O_2$ sensor 24. When the three-way catalyst 14 ends up completely deteriorating, the output voltage VOS of the downstream $O_2$ sensor 24 fluctuates by the same period as the output voltage VOM of the upstream $O_2$ sensor 23. The curve Y in FIG. 14C shows when the three-way catalyst 14 has deteriorated. As will be understood from the curve X and curve Y of FIG. 14C, when the three-way catalyst 14 deteriorates, the period of fluctuation of the downstream $O_2$ sensor 24 becomes shorter.

In this way, when the three-way catalyst 14 deteriorates, the period of fluctuation of the downstream $O_2$ sensor 24 becomes shorter, so the length ΣLS of the output becomes larger. On the other hand, even when the period of fluctuation of the downstream $O_2$ sensor 24 changes, the area ΣAS of the output within a predetermined time does not change much at all. Accordingly, if the three-way catalyst 14 deteriorates, the ratio of length becomes larger, but the ratio of area does not change much at all and thus the point a of FIG. 13 shifts to the point b. Further, if the $O_2$ sensors 23 and 24 deteriorate in the state where the three-way catalyst 14 has deteriorated, the point showing the relationship between the ratio of length and the ratio of area shifts on the line B passing through the origin O. Accordingly, as explained above, basically, if the point showing the relationship between the ratio of length and the ratio of area is positioned in the area above the line W passing through the origin O, it may be judged that the three-way catalyst 14 has deteriorated.

In actuality, however, in particular, the output voltage VOS of the downstream $O_2$ sensor 24 does not change by a clean waveform as shown in FIG. 14B and FIG. 14C. A fine vibration is superposed on the curves X and Y shown by FIG. 14B and FIG. 14C. This fine vibration does not have that great an effect on the area ΣAM of the output of the downstream $O_2$ sensor 24, but has a larger effect on the length ΣLS of the output the smaller the ratio of length (ΣLS/ΣLM). That is, if the length ΣLS of the output is increased by exactly a certain amount due to the fine vibration superposed on the curves X and Y, the amount of increase of the ratio of length becomes larger the smaller the ratio of length. Accordingly, if it is judged that the three-way catalyst 14 has deteriorated by the line W being exceeded, when the ratio of length is small, there is a danger of mistaken judgement that the three-way catalyst 14 has deteriorated despite the three-way catalyst 14 not having deteriorated.

Therefore, in this embodiment of the present invention, as shown in FIG. 13, the threshold level Th of the judgement of deterioration of the catalyst is made the threshold level $Th_1$ matching the line W in the region where the ratio of length and ratio of area are large to a certain degree. In the region where the ratio of length and the ratio of area are small, the threshold level $Th_2$ is made a certain ratio of length. Accordingly, if the point showing the relationship between the ratio of length and the ratio of area in this embodiment of the present invention is positioned in the region above the set value in FIG. 13, that is, the threshold levels $Th_1$ and $Th_2$, it is judged that the three-way catalyst 14 has deteriorated. Note that the threshold level $Th_2$ is not derived from theory, but is determined based on experiments so that there are no mistaken judgements.

However, as explained above, in this embodiment of the present invention, in FIG. 5, before the output voltage VOS of the downstream $O_2$ sensor 24, that is, while the amplitude of the output voltage VOS of the downstream $O_2$ sensor 24 is small, the judgement of deterioration of the three-way catalyst 14 is started. At this time, if the upstream end of the three-way catalyst 14 considerably deteriorates, the period of fluctuation of the output voltage VOS of the downstream $O_2$ sensor 24 becomes shorter and therefore the ratio of lengths (ΣLS/ΣLM) increases. However, as explained above, at this time, the amplitude of the output voltage VOS of the downstream $O_2$ sensor 24 is small, so even if the ratio of lengths (ΣLS/ΣLM) increases, it does not increase that much. That is, the more the threshold level Th of FIG. 13 is exceeded, the more the ratio of lengths (ΣLS/ΣLM) does not become larger. As a result, it is mistakenly judged that the three-way catalyst 14 has deteriorated despite its not having done so.

As will be understood from FIG. 5, the lower the degree of activation of the downstream $O_2$ sensor 24, that is, the lower the temperature of the downstream $O_2$ sensor 24, the smaller the amplitude of the output voltage VOS of the downstream $O_2$ sensor 24. Accordingly, even if the degree of deterioration of the three-way catalyst 14 is the same, the lower the temperature of the downstream $O_2$ sensor 24, the smaller the ratio of lengths (ΣLS/ΣLM). Accordingly, in this embodiment of the present invention, the threshold level Tha, Thb, Thc is changed in accordance with the temperature of the downstream $O_2$ sensor 24 as shown in FIG. 15 so as to enable accurate detection of the deterioration of the three-way catalyst 14. Note that in FIG. 15, the lower the temperature of the downstream $O_2$ sensor 24, the lower the threshold level is made in the order of Tha, Thb, and Thc.

Next, an explanation will be made of the routine for judgement of deterioration of the three-way catalyst 14 referring to FIG. 16 and FIG. 17. Note that this routine is executed by interruption every predetermined time interval.

Figure 16:
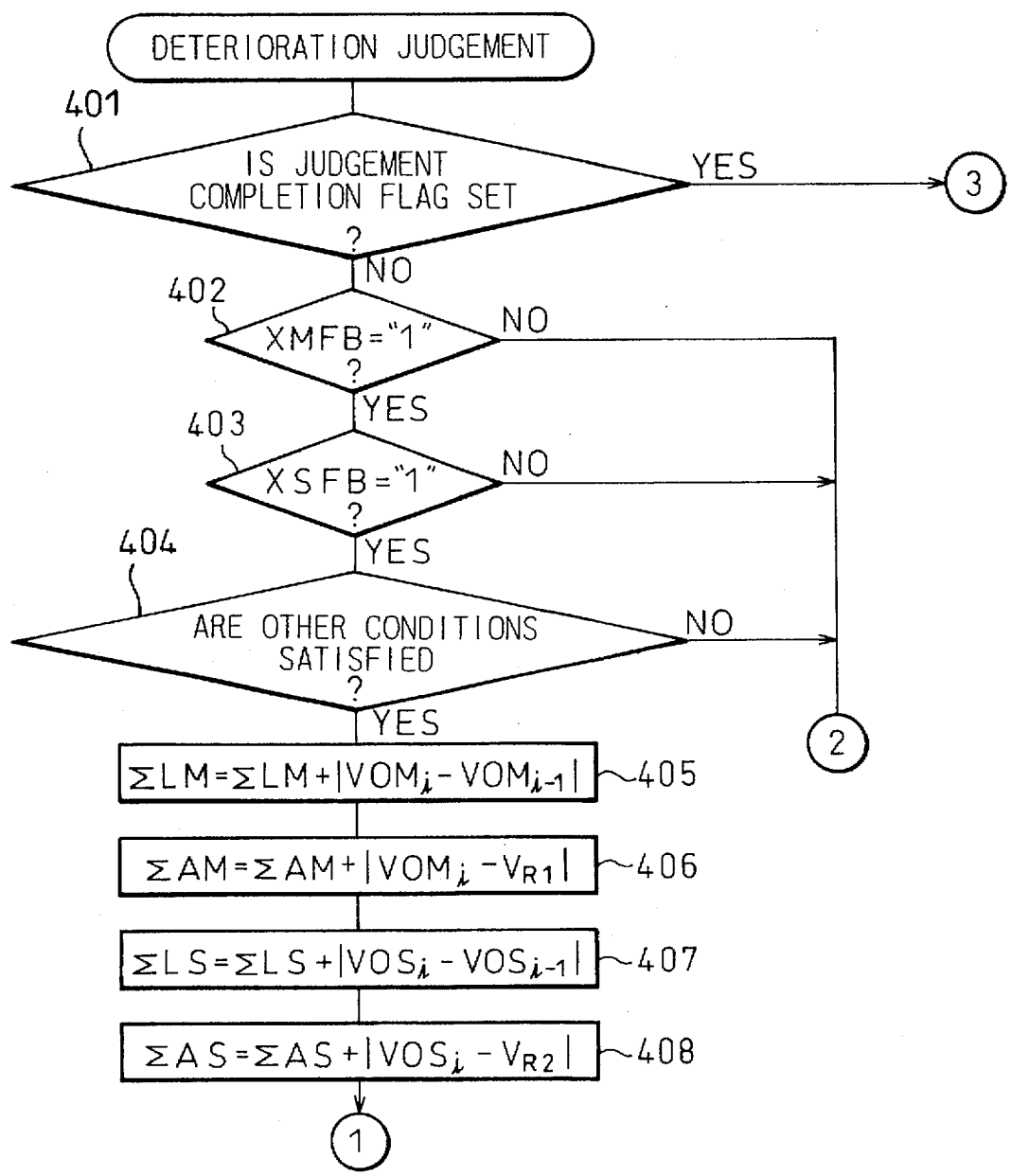
FIGS. 16 and 17 are flow charts for judging the deterioration of the three-way catalyst.
Figure 17:
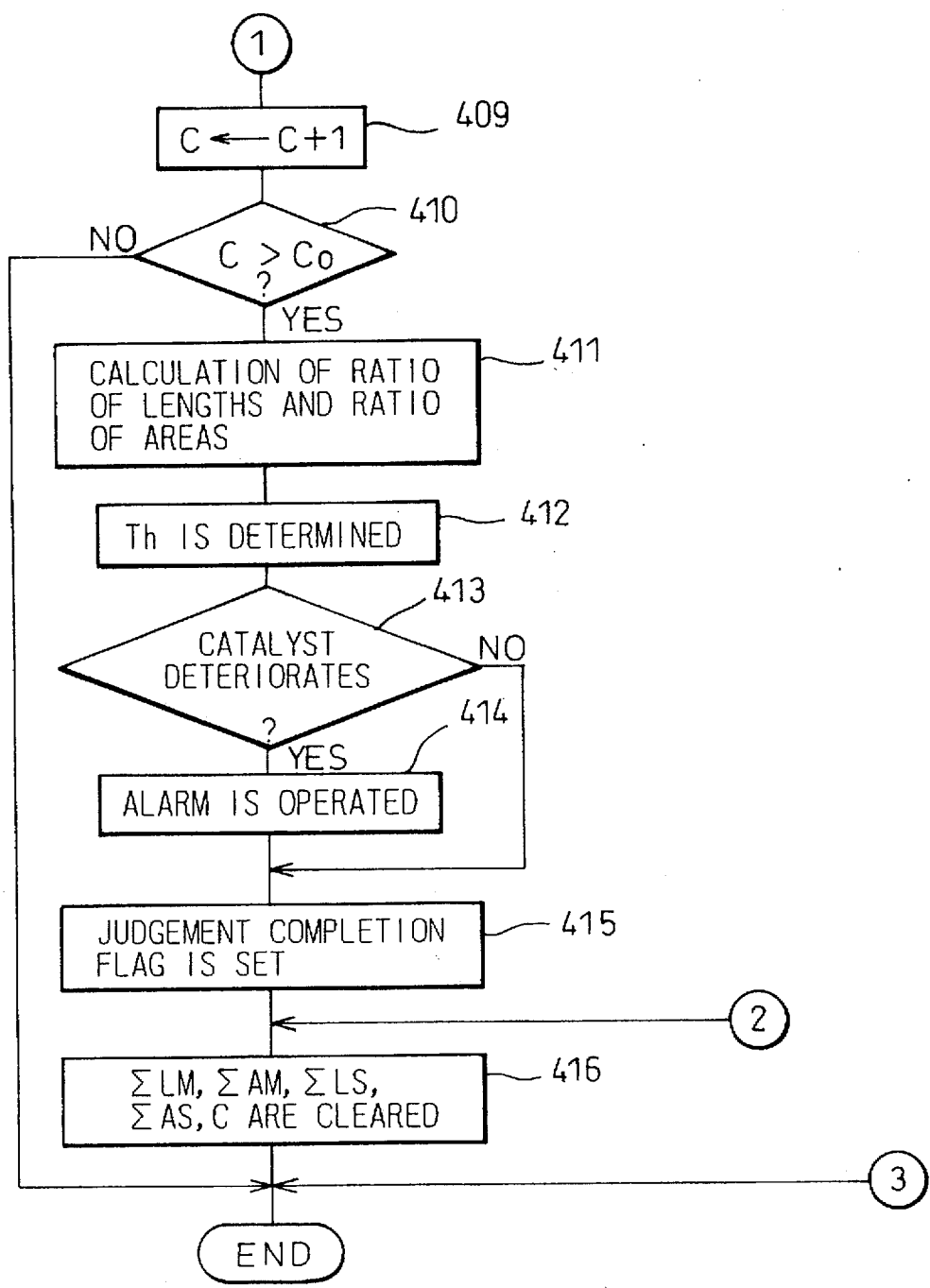

Referring to FIG. 16 and FIG. 17, first, at step 401, it is judged if the judgement completion flag showing that the judgement of deterioration has ended has been set or not. When the judgement completion flag has been set, the processing cycle is immediately ended. As opposed to this, when it is judged that the judgement completion flag has not been set, the routine proceeds to step 402, where it is judged if the air-fuel ratio feedback flag XMFB showing that feedback control of the air-fuel ratio by the upstream $O_2$ sensor 23 is being performed has been set (="1") or not. When the air-fuel ratio feedback flag XMFB has not been set (="0"), the routine jumps to step 416, where the various values involved in the judgement of deterioration are cleared. As opposed to this, when it is judged that the air-fuel ratio feedback flag XMFB has been set (="1"), the routine proceeds to step 403.

At step 403, it is judged if the air-fuel ratio feedback flag XSFB showing that feedback control of the air-fuel ratio by the downstream $O_2$ sensor 24 is being performed has been set (="1") or not. When the air-fuel ratio feedback flag XSFB has not been set (="0"), the routine jumps to step 416, while when the air-fuel ratio feedback flag XSFB has been set (="1"), the routine proceeds to step 404. At step 404, it is judged if the other conditions for judgement are satisfied. For example, it is judged that the other conditions for judgement are satisfied when the engine load Q/N is within a predetermined range and the engine speed N is within a predetermined range. When the other conditions for judgement are not satisfied, the routine jumps to step 416, while when the other conditions for judgement are satisfied, the routine proceeds to step 405, where the judgement of deterioration is started.

At step 405, the processing for cumulatively adding the length $\Sigma LM$ of the output of the upstream $O_2$ sensor 23 is performed based on the following equation:

$$\Sigma LM = \Sigma LM + |VOM_i - VOM_{i-1}|$$

Next, at step 406, the processing for cumulatively adding the area $\Sigma AM$ of the output of the upstream $O_2$ sensor 23 is performed based on the following equation:

$$\Sigma AM = \Sigma AM + |VOM_i - V_{R1}|$$

Next, at step 407, the processing for cumulative addition of the length $\Sigma LS$ of the output of the downstream $O_2$ sensor 24 is performed based on the following equation:

$$\Sigma LS = \Sigma LS + |VOS_i - VOS_{i-1}|$$

Next, at step 408, the processing for cumulatively adding the area $\Sigma AS$ of the output of the downstream $O_2$ sensor 24 is performed based on the following equation:

$$\Sigma AS = \Sigma AS + |VOS_i - V_{R2}|$$

Next, at step 409, the count C is incremented by exactly 1, then at step 410, it is judged if the count C has exceeded the set value $C_0$. When $C \leq C_0$, the processing cycle is ended. As opposed to this, when $C > C_0$, that is, when a predetermined time has elapsed from the start of the judgement of deterioration, the routine proceeds to step 411.

At step 411, the ratio of length $\Sigma LS / \Sigma LM$ and the ratio of area $\Sigma AS / \Sigma AM$ are calculated. Next, at step 412, the threshold levels Tha, Thb, and Thc shown in FIG. 15 are set from the temperature of the downstream $O_2$ sensor 24. Next, at step 413, it is judged whether the three-way catalyst 14 has deteriorated using these set threshold levels. When it is judged that the three-way catalyst 14 has not deteriorated, the routine proceeds to step 415, where the judgement completion flag is set. As opposed to this, when it is judged that the three-way catalyst 14 has deteriorated, the routine proceeds to step 414 where the alarm device 25 is actuated, then the routine proceeds to step 415. Next, at step 416, the various values involved in the judgement of deterioration are cleared.

Figure 18:
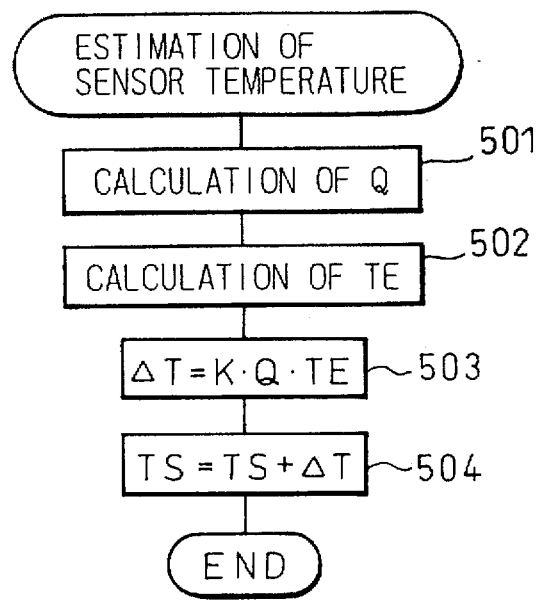
FIG. 18 is a flow chart of the estimation of the sensor temperature.
Figure 19:
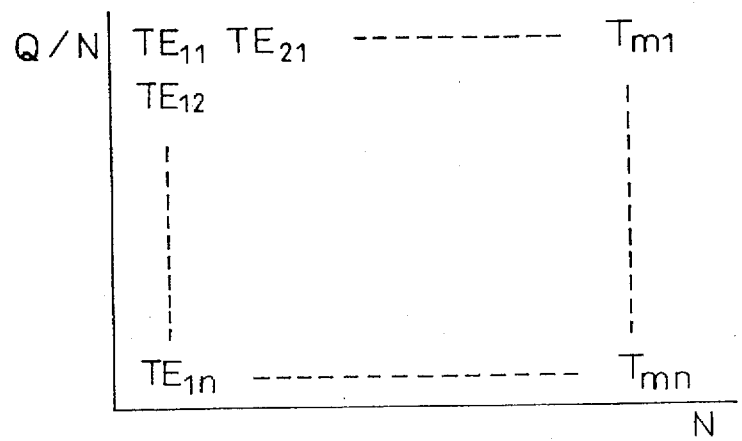
FIG. 19 is a view of a map of an exhaust gas temperature TE.
Figure 20:
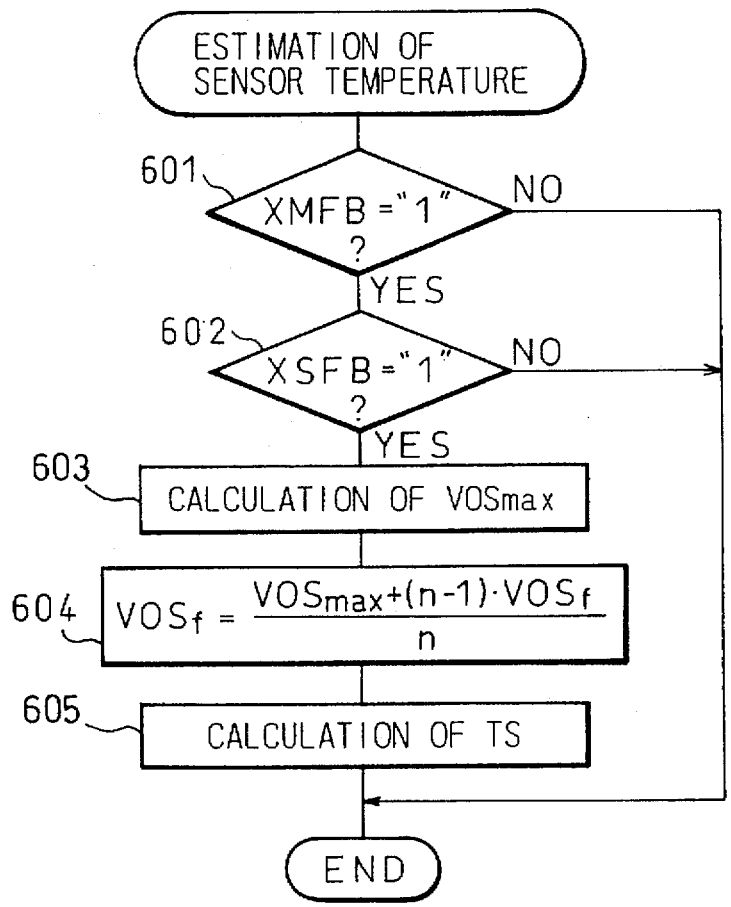
FIG. 20 is a flow chart of the estimation of the sensor temperature.
Figure 21:
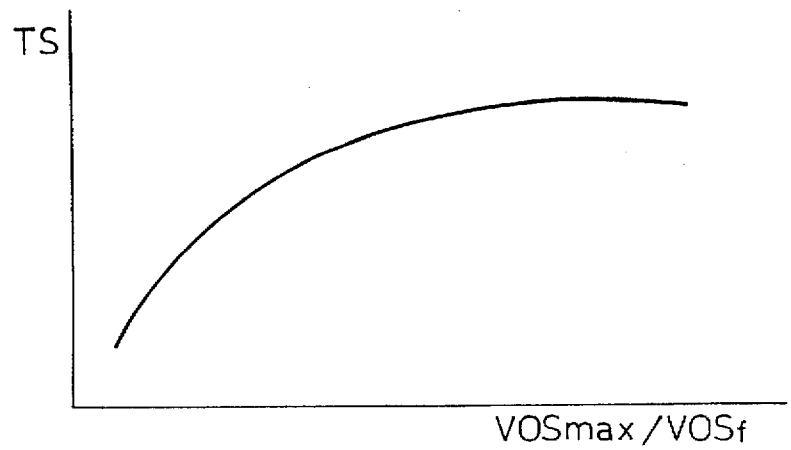
FIG. 21 is a view of the sensor temperature TS.

As explained above, at step 412, the threshold level is set from the temperature of the downstream $O_2$ sensor 24. The temperature of the downstream $O_2$ sensor 24 can be actually measured, but may also be estimated. FIG. 18 and FIG. 19 show a first embodiment for estimating the temperature of the downstream $O_2$ sensor 24. FIG. 20 and FIG. 21 show a second embodiment for estimating the temperature of the downstream $O_2$ sensor 24.

FIG. 18 shows the routine for estimation of the sensor temperature. This routine is executed by interruption every predetermined time interval.

Referring to FIG. 18, first, at step 501, the amount of intake air Q is calculated. Next, at step 502, the exhaust gas temperature TE is calculated. This exhaust gas temperature TE is stored in advance in the ROM 32 in the form of a function of the engine load Q/N (amount of intake air Q/engine speed N) and the engine speed N as shown in FIG. 19. Next, at step 503, the amount of temperature rise $\Delta T$ of the downstream $O_2$ sensor 24 in the interruption time interval is calculated based on the following equation:

$$\Delta T = K \cdot Q \cdot TE$$

Here, K is a constant. That is, since it is considered that the amount of rise of temperature of the downstream $O_2$ sensor 24 per unit time is proportional to the temperature of the exhaust gas, the amount of temperature rise $\Delta T$ of the downstream $O_2$ sensor 24 in the interruption time interval is expressed by the above equation. Next, at step 504, $\Delta T$ is cumulatively added, whereby the temperature TS of the downstream $O_2$ sensor 24 is calculated. In the first embodiment, the threshold level is set from the temperature TS found in this way.

FIG. 20 shows a second embodiment of the routine for estimation of the sensor temperature. This routine is also executed by interruption every predetermined time interval.

Referring to FIG. 20, first, at step 601, it is judged if the air-fuel ratio feedback flag XMFB has been set (="1") or not. When XMFB="1", the routine proceeds to step 602. At step 602, it is judged if the air-fuel ratio feedback flag XSFB has been set (XSFB ="1") or not. When XSFB="1", the routine proceeds to step 603. At step 603, the maximum value $VOS_{max}$ of the output voltage VOS of the downstream $O_2$ sensor 24 during the time from engine startup to the present is calculated. Next, at step 604, the average value $VOS_f$ (see FIG. 5) of the maximum value of the output voltage VOS of the downstream $O_2$ sensor 24 after the completion of warmup is calculated based on the following equation:

$$VOS_f = [VOS_{max} + (n-1) \cdot VOS_f]/n$$

Here, n is a constant of for example about 100. The value of $VOS_f$ is stored in the backup RAM 35. Next, at step 605, the temperature TS of the downstream $O_2$ sensor 24 is calculated based on the relationship shown in FIG. 21. That is, FIG. 21 shows the relationship between TS and $VOS_{max}/VOS_f$. The larger $VOS_{max}/VOS_f$, the higher the temperature of the downstream $O_2$ sensor 24. In the second embodiment, the threshold level is set from the temperature TS found in this way.

In this way, in the present invention, it is possible to accurately judge whether or not the catalyst slightly deteriorates.

While the invention has been described by reference to specific embodiments chosen for purposes of illustration, it should be apparent that numerous modifications could be made thereto by those skilled in the art without departing from the basic concept and scope of the invention.

I claim:

1. A device for judging the deterioration of a catalyst arranged in an exhaust passage of an engine, comprising
air-fuel ratio detecting means arranged in the exhaust passage and producing an output signal representative of the air-fuel ratio;
deterioration degree calculating means for calculating a degree of the deterioration of the catalyst on the basis of the output signal of said air-fuel ratio detecting means;
deterioration judging means for judging that the catalyst deteriorates when said degree of deterioration exceeds a predetermined threshold value;

estimating means for estimating a degree of activation of said air-fuel ratio detecting means; and threshold value controlling means for controlling said threshold value in response to said degree of activation to lower said threshold value the lower said degree of activation.

2. A device as set forth in claim 1, wherein said air-fuel ratio detecting means is provided with an upstream air-fuel ratio sensor arranged in the exhaust passage upstream of the catalyst and a downstream air-fuel ratio sensor arranged in the exhaust passage downstream of the catalyst, said deterioration calculating means calculates a ratio of lengths which is a ratio of a length of the output signal response curve of said downstream air-fuel ratio sensor to a length of the output signal response curve of said upstream air-fuel ratio sensor, and said deterioration judging means judges that the catalyst has deteriorated when said ratio of lengths exceeds said threshold value.

3. A device as set forth in claim 2, wherein said deterioration degree calculating means calculates a ratio of areas which is a ratio of an area surrounded by the output signal response curve and the reference value line of said downstream air-fuel ratio sensor with respect to an area surrounded by the output signal response curve and the reference value line of said upstream air-fuel ratio sensor, said threshold value is a function of said ratio of areas, and said deterioration judging means judges that the catalyst has deteriorated when said ratio of lengths exceeds said threshold value determined from said ratio of areas.

4. A device as set forth in claim 3, wherein said threshold value is substantially constant when said ratio of areas is smaller than a predetermined value and said threshold value increases along with the increase of said ratio of areas when the ratio of areas is larger than a predetermined value.

5. A device as set forth in claim 1, wherein storing means is provided for storing threshold values which are lower the lower the degree of activation and wherein said threshold value controlling means uses as the threshold value for judging the deterioration a threshold value selected from said threshold values stored in said storing means in accordance with said degree of activation.

6. A device as set forth in claim 1, wherein said estimating means estimates said degree of activation based on the temperature of said air-fuel ratio detecting means.

7. A device as set forth in claim 6, wherein said estimating means estimates said degree of activation by cumulatively adding the amount of rise of temperature per unit time of said air-fuel ratio detecting means.

8. A device as set forth in claim 7, wherein the amount of temperature rise per unit time of said air-fuel ratio detecting means is expressed by a product of the amount of air supplied to the engine and the temperature of the exhaust gas.

9. A device as set forth in claim 6, wherein said estimating means estimates said degree of activation based on a ratio of a maximum value of the output of said air-fuel ratio detecting means after engine startup and the output of said air-fuel ratio detecting means after said air-fuel ratio detecting means finishes warming up.

10. A device as set forth in claim 9, where the smaller said ratio, the lower said degree of deterioration is estimated.

11. A device as set forth in claim 9, wherein the output of the air-fuel ratio detecting means after the air-fuel ratio detecting means finishes warming up is calculated from the average value of the air-fuel ratio detecting means over a long period.

* * * * *